US006197201B1

(12) United States Patent
Misra et al.

(10) Patent No.: US 6,197,201 B1
(45) Date of Patent: Mar. 6, 2001

(54) PROCESS FOR REMOVAL AND STABILIZATION OF ARSENIC AND SELENIUM FROM AQUEOUS STREAMS AND SLURRIES

(75) Inventors: Manoranjan Misra; Joseph Nanor; Gautam Priyadarshan, all of Reno, NV (US)

(73) Assignee: The Board of Regents of the University & Community College System of Nevada, Reno, NV (US)

( * ) Notice: Subject to any disclaimer, the term of this patent is extended or adjusted under 35 U.S.C. 154(b) by 0 days.

(21) Appl. No.: 09/124,815

(22) Filed: Jul. 29, 1998

(51) Int. Cl.[7] .................................................. C02F 1/52
(52) U.S. Cl. .................... 210/721; 210/724; 210/726; 210/756; 210/911
(58) Field of Search .................................. 210/721, 723, 210/724, 911, 912, 726, 756

(56) References Cited

U.S. PATENT DOCUMENTS

| 3,933,635 | 1/1976 | Marchant | 210/50 |
| 3,956,118 | 5/1976 | Kleber et al. | 210/45 |
| 4,405,464 | 9/1983 | Baldwin et al. | 210/717 |
| 4,440,647 | * | 4/1984 | Puchalski | 210/725 |
| 4,519,913 | 5/1985 | Baldwin et al. | 210/610 |
| 5,603,838 | 2/1997 | Misra et al. | 210/665 |
| 5,683,953 | * | 11/1997 | Mills | 210/724 |

OTHER PUBLICATIONS

Bar–Yosef, B. and Meek, D. (1987), "Selenium Sorption by Kaolinite and Montmorillonite," Soil Sci. 144:11–19.
Davis, S.A. and Misra, M. (1997), "Transport Model for the Adsorption of Oxyanions of Selenium (IV) and Arsenic (V) from Water onto Lanthanum–and Aluminum–Based Oxides," J. Colloid Interface Sci. 188:340–350.

(List continued on next page.)

Primary Examiner—Ivars Cintins
(74) Attorney, Agent, or Firm—Greenlee, Winner and Sullivan, P.C.

(57) ABSTRACT

A process for removing or stabilizing arsenic and/or selenium from aqueous streams or slurries is provided that includes contacting the streams or slurry with a composition containing lanthanum chloride. The lanthanum chloride composition can optionally contain various lanthanides. The composition can optionally contain ferric or ferrous sulfate. The process is preferably conducted by adjusting the pH of solution to between about 8 or 10, adding 2 moles of lanthanum chloride for every mole of arsenic or selenium ions present in solution, adding 5 to 6 moles ferric or ferrous ions for every mole of arsenic or selenium ions present in solution and adjusting the oxidation potential of the solution to between 200–400 mV for removal of selenium ions and between 100–200 mV for removal of arsenic ions. Using the processes of this invention, the selenium and arsenic concentrations can be reduced to less than currently acceptable limits and arsenic and selenium can be stabilized from leaching, decomposition or other degradation processes.

28 Claims, 12 Drawing Sheets

OTHER PUBLICATIONS

Fitzgerald, N.M. et al., "Novel Magnesium Oxide–Aluminum Oxide Hydrotalcite–like Adsorbent for the Removal of Toxic Metals from Aqueous Stream," Alcoa Laboratories, Alcoa Center, PA.

Ghosh, M.M. and Yuan, J.R. (1987), "Adsorption of Inorganic and Organoarsenicals on Hydrous Oxides," Environmental Progress 6(3):150–157.

Gulledge, J.H. and O'Connor, J.T. (Aug. 1973), "Removal of Arsenic (V) From Water by Adsorption on Aluminum and Ferric Hydroxides," Journal of American Water Works Association 65:548–552.

Gupta, S.K. and Chen, K.Y. (Mar. 1978), "Arsenic Removal by Adsorption," J. Water Pollution Control Federation 50(3):493.

Harper, T.R. and Kingham, N.W. (1992), "Removal of Arsenic from Wastewater Using Chemical Precipitation Methods," Water Environ. Res. 64(3):200–203.

Jinadasa, K.B.P.N. and Dissanayake, C.B. (1992), "The effect of selenium on fluoride–clay interactions: possible environmental health implications," Environ. Geochem. Health 14(1):3–7.

Masscheleyn, P.H. et al. (1990), "Transformations of Selenium as Affected by Sediment Oxidation–Reduction Potential and pH," Environ. Sci. Technol. 24(1):91–96.

Merrill, D.T. et al. (1987), "Field Evaluation of Arsenic and Selenium Removal by Iron Coprecipitation," Environ. Prog. 6(2):82–90.

Murphy, A.P. (1988), "Removal of Selenate from Water by Chemical Reduction," Ind. Eng. Chem. Res. 27:187–191.

Pontius, F.W. (1994), "Crafting a New Arsenic Rule," J. Am. Water Works Assn., vol. 86, pp. 6–10.

Rubel, F.R. and Hathaway, S.W. (1985), "Pilot Study for Removal of Arsenic from Drinking Water at the Fallon, Nevada, Naval Air Station," Project Summary, Research and Development EPA/600/S2–85/094, Sep. 1985.

U.S. Environmental Protection Agency, (May 1977), "Manual of Treatment Techniques for Meeting the Interim Primary Drinking Water Regulations," pp. 29–31.

Wasay, S.A. et al. (1996), "Removal of Arsenite and Arsenate Ions From Aqueous Solution by Basic Yttrium Carbonate," Wat. Res. 30(5):1143–1148.

* cited by examiner

```
┌─────────────────────────────────────────────┐
│ In a liter plastic bottle, mix 330g as      │
│ received ore with 500ml D.I. water and      │
│ stir for 2-3 minutes.                        │
└─────────────────────────────────────────────┘
                     │
┌─────────────────────────────────────────────┐
│ Adjust pH to 10.5 with Ca(OH)$_2$           │
└─────────────────────────────────────────────┘
                     │
┌─────────────────────────────────────────────┐
│ Add 350mg NaCN and stir for 5 minutes.      │
│ Then measure pH.                             │
└─────────────────────────────────────────────┘
                     │
┌─────────────────────────────────────────────┐
│ Adjust pH to 10.5 with Ca(OH)$_2$           │
└─────────────────────────────────────────────┘
                     │
┌─────────────────────────────────────────────┐
│ Bottle roll slurry for 24 hours.             │
└─────────────────────────────────────────────┘
                     │
┌─────────────────────────────────────────────┐
│ Add required amount of lanthanum chloride   │
│ and stir for 1-2 minutes.                    │
└─────────────────────────────────────────────┘
                     │
┌─────────────────────────────────────────────┐
│ Add required amount of dissolved ferric     │
│ sulphate drop by drop and stir for 1 hour.  │
└─────────────────────────────────────────────┘
                     │
┌─────────────────────────────────────────────┐
│ Filter slurry with 0.45 micrometer filter   │
│ paper                                        │
└─────────────────────────────────────────────┘
                     │
┌─────────────────────────────────────────────┐
│ Acidify filtrate with HNO$_3$ then analyze   │
│ for As.                                      │
└─────────────────────────────────────────────┘
```

FIG. 9

```
┌─────────────────────────────────────────────┐
│ Weigh 500 grams of as received slurry into a 1000ml │
│ beaker.                                     │
└─────────────────────────────────────────────┘
                      │
┌─────────────────────────────────────────────┐
│ Mix slurry at 80 - 100 rpm for 10 minutes. While │
│ mixing measure Eh and pH.                   │
└─────────────────────────────────────────────┘
                      │
┌─────────────────────────────────────────────┐
│ Adjust pH to 10 using dilute Ca(OH)$_2$     │
└─────────────────────────────────────────────┘
                      │
┌─────────────────────────────────────────────┐
│ Dissolved required amount of Fe$_2$(SO)$_4$.5H$_2$O in │
│ 5ml D.I. water and add drop by drop to slurry. Mix │
│ for 5 minutes then measure pH.              │
└─────────────────────────────────────────────┘
                      │
┌─────────────────────────────────────────────┐
│ Adjust pH to 10 with Ca(OH)$_2$ and mix for 1hr, 2hrs, │
│ 4hrs and 24hrs                              │
└─────────────────────────────────────────────┘
                      │
┌─────────────────────────────────────────────┐
│ After each time specified above take 50ml of slurry and │
│ filter with 0.45um filter paper. Then measure Eh and │
│ pH. If pH below 10 adjust to 10 with Ca(OH)$_2$ │
└─────────────────────────────────────────────┘
                      │
┌─────────────────────────────────────────────┐
│ Analyze filtrate for Arsenic (AAS)          │
└─────────────────────────────────────────────┘
```

FIG. 10

```
┌─────────────────────────────────────────────┐
│ Weigh 500 grams of as received Slurry into a 1000ml │
│ beaker.                                     │
└─────────────────────────────────────────────┘
                      │
┌─────────────────────────────────────────────┐
│ Mix slurry at 80 - 100 rpm for 10 minutes. While │
│ mixing measure Eh and pH.                   │
└─────────────────────────────────────────────┘
                      │
┌─────────────────────────────────────────────┐
│ Adjust pH to 10 using dilute Ca(OH)₂        │
└─────────────────────────────────────────────┘
                      │
┌─────────────────────────────────────────────┐
│ Add required amount of LaCl₃ drop by drop. Mix for │
│ 5 minutes then measure pH.                  │
└─────────────────────────────────────────────┘
                      │
┌─────────────────────────────────────────────┐
│ Adjust pH to 10 with Ca(OH)₂ and mix for 1hr, 2hrs, │
│ 4hrs and 24hrs                              │
└─────────────────────────────────────────────┘
                      │
┌─────────────────────────────────────────────┐
│ After each time specified above take 50ml of slurry and │
│ filter with 0.45um filter paper. Then measure Eh and │
│ pH. If pH below 10 adjust to 10 with Ca(OH)₂ │
└─────────────────────────────────────────────┘
                      │
┌─────────────────────────────────────────────┐
│ Analyze filtrate for Arsenic (AAS)          │
└─────────────────────────────────────────────┘
```

PROCESS FOR REMOVAL AND STABILIZATION OF ARSENIC AND SELENIUM FROM AQUEOUS STREAMS AND SLURRIES

BACKGROUND OF THE INVENTION

Arsenic is a commonly occurring toxic metal in natural ecosystems. Its presence in natural waters may originate from geochemical reactions, industrial waste discharges, or agricultural use of pesticides containing arsenic (Gupta, S. K. and Chen, K. Y., "Arsenic Removal by Adsorption," 50(3) Journal of Water Pollution Control Federation 493 (March. 1978)). Arsenic is also present in the gold cyanidation process. It is present in gold extraction processes which utilize roasting, pressure autoclaving and other oxidation pathways. The presence of arsenic in water beyond the currently permissible limit of 50 ppb has carcinogenic effects on living things (Shen, Y. S. and Chen, C. S., Proceedings of $2^{nd}$ International Congress on Water Pollution Resources, Tokyo, Vol. 1, Pergamon Press, New York, 173–179 (1964)). Hyperpigmentation, skin cancer, liver cancer, circulatory disorders and other ailments have been attributed to the presence of arsenic in water (National Academy of Sciences, "Arsenic—Medical and Biological Effects of Environmental Pollutants," U.S. Government Printing Office, Washington, D.C. (1977)). Although it has been suggested that arsenic may be an essential micro nutrient for humans and animals (Krapf, N.E., "Commercial Scale Removal of Arsenite, Arsenate and Methane Arsenate from Ground and Surface Water; Arsenic: Industrial, Biomedical, Environmental Perspectives," W. Lederer and R. Fensterheim (eds.), Van Nostrand Reinhold Company, New York, N.Y., 269 (1983)), the presence of arsenic in amounts exceeding suggested nutritional requirements can be detrimental.

In the United States, arsenic concentrations in waste waters, surface and ground waters, and geothermal waters frequently exceed the recommended limits for drinking water (United States Public Health Service Drinking Water Standards, U.S. Department of Health, Education and Welfare, USPHS Publication No. 956, (1962)). The United States Environmental Protection Agency is currently re-evaluating the existing Maximum Contaminant Level (MCL) for arsenic in drinking waters which is currently 0.05 mg/l. The revised MCL for arsenic is expected to be somewhere between 0.002 and 0.02 mg/l (Pontius, F. W., "Crafting a New Arsenic Rule," 86 Journal of American Water Works Association, 6–10 (1994)).

Arsenic occurs in inorganic form in aquatic environments, resulting from the dissolution of solid phases such as arsenolite ($As_2O_3$), arsenic anhydride ($As_2O_5$) and realgar ($AsS_2$). The chemistry of arsenic in aquatic systems is complex because the element can be stable in four major oxidation states (+5, +3, 0 and −3) under different redox conditions. In natural waters arsenic is found as an anion with acid characteristics in only the As(III) and As(V) oxidation states. In oxygenated waters, the oxyanions of arsenic exist in four different arsenate species as $H_3AsO_4$, $H_2AsO_4^-$, $H_3AsO_4^{2-}$ and $AsO_4^{3-}$ in the pH ranges of <2, 3–6, 8–10 and >12, respectively. Under mildly reducing conditions the arsenite species $H_3AsO_3$, $H_2AsO_3^-$ and $HAsO_3^{2-}$ become predominant in the pH ranges of 7–8, 10–11 and 12–13, respectively (Wasay, S. A., Haron, Md. J. and Uchiumi Akira, "Removal of Arsenite and Arsenate Ions from Aqueous Solution by Basic Yttrium Carbonate" 30 Water Resources, 1143–1148 (1995)). The amounts of the various species of arsenic and the stability of the various species in a given solution depends on the pH of the solution (Gulledge, J. H. and O'Connor, J. T., "Removal of Arsenic (V) from Water by Adsorption on Aluminum and Ferric Hydroxides" 65 Journal of American Water Works Association, 548–552 (1973)). In most waters, a mixture of As(III) and As(V) species are usually present.

Selenium also occurs in inorganic form in aquatic environments. Selenium typically occurs in the selenate (VI) and selenite (IV) oxidation states. The presence of selenium in drinking and ground water also causes health and environmental problems similar to the problems that exist when arsenic is present. The current allowable maximum concentration level for selenium in drinking water set by federal standards is 0.01 milligrams per liter (Baldwin, R. A., et. al. "Process for the removal of selenium from aqueous solution," U.S. Pat. No. 4,405,464).

Several methods for reducing selenium and arsenic concentrations to acceptable levels have been studied and are being used currently. These methods include coagulation and precipitation using ferric chloride and sulfate, ion exchange, reverse osmosis and adsorption using activated carbon and alumina. These methods are effective to a certain extent. However, these methods are considerably more expensive and generally narrower in application than is desired for the treatment of large volumes of water.

The use of ferric chloride, hydrated lime, sodium sulfate and alum to coagulate water containing arsenic has been described (Harper, T. R. and Kingham, N. W. "Removal of arsenic from wastewater using chemical precipitation methods," 64(3) Water Environment Research 200–203 (1992)). Ferric chloride has also been used to precipitate selenium. These methods require multiple treatments of the water with the coagulation chemicals and large amounts of chemicals relative to the amount of arsenic and selenium present to obtain the desired reduction in arsenic concentration. In addition, the methods produce sludge that requires dewatering or solidification and eventual landfill storage as hazardous waste. Also, the ferric chloride process requires pH of less than 6.5 (Merrill, D. T. et al., "Field Evaluation of Arsenic and Selenium Removal by Iron Coprecipitation," 6(2) Environmental Progress 82–90 (1987)).

In addition to the waste disposal problems and large amounts of reagent chemicals required, laboratory tests and pilot plant studies have shown that chemical precipitation employing alum, lime, ferrous sulfate or ferric sulfate, is substantially ineffective for removing selenium in the selenate (Se(VI)) oxidation state from water. Studies on water having a selenium Se(VI) concentration of 0.03 to 10 milligrams per liter have shown that the conventional chemical precipitation methods remove less than ten percent of the selenium from the water (U.S. Environmental Protection Agency, "Manual of Treatment Techniques for Meeting the Interim Primary Drinking Water Regulations," 29–31 (May 1977)).

U.S. Pat. No. 4,405,464 provides a method by which selenium, as selenate, can be chemically precipitated from an aqueous solution using metallic iron. The patent also discloses removal of a substantial portion of selenium in its selenite oxidation state. This process is economically more attractive than either the ion exchange or reverse osmosis methods which have been proposed or which are currently in use. However, this method is not suitable for aqueous solutions having pH greater than 6.0. Thus, if the water is alkaline or neutral, it must be acidified through the addition of an acid. Also, the method does not reduce the selenium concentration in water to meet drinking water quality standards.

U.S. Pat. No. 3,933,635 discloses a process for removing selenium ions present in the selenite oxidation state from acidic process waters. Acidic process water, having a pH of about 1.0 to 4.0, is reacted with a metallic reducing agent at a temperature in the range of about 25° C. to about 85° C. for a sufficient time to reduce the soluble selenium in the selenite oxidation state to insoluble elemental selenium. Preferably, the temperature is maintained in the range of about 50° C. to about 70° C. The reducing agent can comprise aluminum, iron or zinc in an appropriate form, such as, for example, powders, scrap fragments, granules, wools and the like. The preferred reducing agent for selenium in the selenite oxidation state is zinc powder.

U.S. Pat. No. 4,519,913 provides a method of reducing the concentration of water-soluble ionic selenium species in aqueous solutions through bacterial treatment in a porous matrix. While this method is disclosed as being effective for removing selenium ions in aqueous solution having pH between 6 and 11, the method requires the use of a specific bacterial strain and nutrients for the bacteria, and produces selenium metal in the porous matrix, which causes disposal problems. In addition, the flow rate of water through the porous membrane must be carefully controlled. The process also takes many clays of operation to cause the selenium concentration in the water to be reduced to acceptable levels.

A method of precipitating arsenite and arsenate ions from aqueous solutions using yttrium carbonate at alkaline pH has also been described (Wasay, S. A., et. al. "Removal of Arsenite and Arsenate Ions from Aqueous Solution by Basic Yttrium Carbonate" 30(5) Wat. Res. 1143–1148 (1996)). This method requires strict control of pH to achieve removal sufficient to comply with environmental standards. In addition, the effective pH range was found to depend on which arsenic species is desired to be precipitated.

U.S. Pat. No. 3,956,118 discloses a process for removing phosphate ions from waste waters using a rare earth salt. However, the disclosed process is limited to removal of phosphates.

Recently new adsorbents, lanthanum oxide and lanthanum-alumina oxide, have been used for removing arsenate, arsenite, selenate, and selenite species from solution (U.S. Pat. No. 5,603,838 (1997)). This patent discloses that lanthanum oxide alone or in conjunction with alumina solids and other oxides can remove arsenic and selenium to low levels (<50 ppb). Also, the adsorption kinetics were found to be extremely fast compared to other adsorbents such as alumina.

The major drawbacks of the processes discussed above include inefficient removal of arsenic and selenium to an acceptably low level for drinking water and discharge into ground water, the problem of filtration of precipitated sludge and fouling of resins and membranes. In addition, once the arsenic and selenium species are removed, the solid materials formed must be disposed of The solid materials formed from the processes above are also susceptible to leaching of the metals at a future time.

There is a need to find a water soluble, highly selective and inexpensive reagent which effectively precipitates and stabilizes arsenate, arsenite, selenate and selenite over a wide pH range, present in solutions or solid/liquid mixtures.

BRIEF SUMMARY OF THE INVENTION

This invention is in the field of removal of toxic metals from aqueous solutions or slurries and stabilizing toxic metals, specifically, removal of selenium and arsenic from aqueous solutions or slurries, industrial process waters and drinking water, and stabilizing selenium and arsenic in slurries containing different ores and rocks mixed with water and other reagents.

It was found that lanthanum chloride is a powerful reagent to precipitate arsenic ions as arsenite and arsenate and selenium ions as selenite or selenate from aqueous solution at various pHs. The lanthanum chloride used can be pure or can be mixed with other elements of the lanthanide series. Lanthanum chloride can also be used in combination with ferrous or ferric sulfate. The combination of iron sulfate and lanthanum chloride at various ratios depending on the initial arsenic or selenium content of the solution can be used to precipitate and remove arsenic and selenium from solutions and slurries over a wide pH range. Surprisingly, when a small amount of lanthanum chloride is added to solutions or slurries containing arsenite, arsenate, selenite or selenate ions, especially in the presence of ferric ions, the ions substantially precipitate from the solution or slurry. The resultant precipitant is extremely stable and easy to filter. The invention also makes it possible to stabilize arsenic and selenium ions in slurries.

The processes of the invention can be used on aqueous solutions from many sources, including effluents from mining operations, industrial waste discharges, agricultural runoff, or any other aqueous stream which contains arsenic ions in the arsenite (As(III)) or arsenate (As(V)) oxidation states or selenium ions in the selenite (Se(IV)) or selenate (Se(VI)) oxidation states. The processes of this invention can also be used on an aqueous solution containing multiple species to be removed.

A method is provided for removing at least one ion selected from the group arsenite, arsenate, selenite and selenate from an aqueous solution or a slurry containing said ion, comprising the steps of:

contacting said solution or slurry with a precipitating composition comprising lanthanum chloride whereby said ion forms a solid material comprising the precipitating composition and said ion; and separating said solution or slurry from the solid material formed.

BRIEF DESCRIPTION OF THE DRAWINGS

FIG. 9 shows the procedures used for arsenic stabilization in gold ore using combination of ferric sulphate and lanthanum chloride.

FIG. 10 shows the procedure used for stabilization of arsenic in tailings slurry with ferric sulfate.

FIG. 11 shows the procedure used for stabilization of arsenic in tailings slurry with lanthanum chloride.

DETAILED DESCRIPTION OF THE INVENTION

Figure 1:
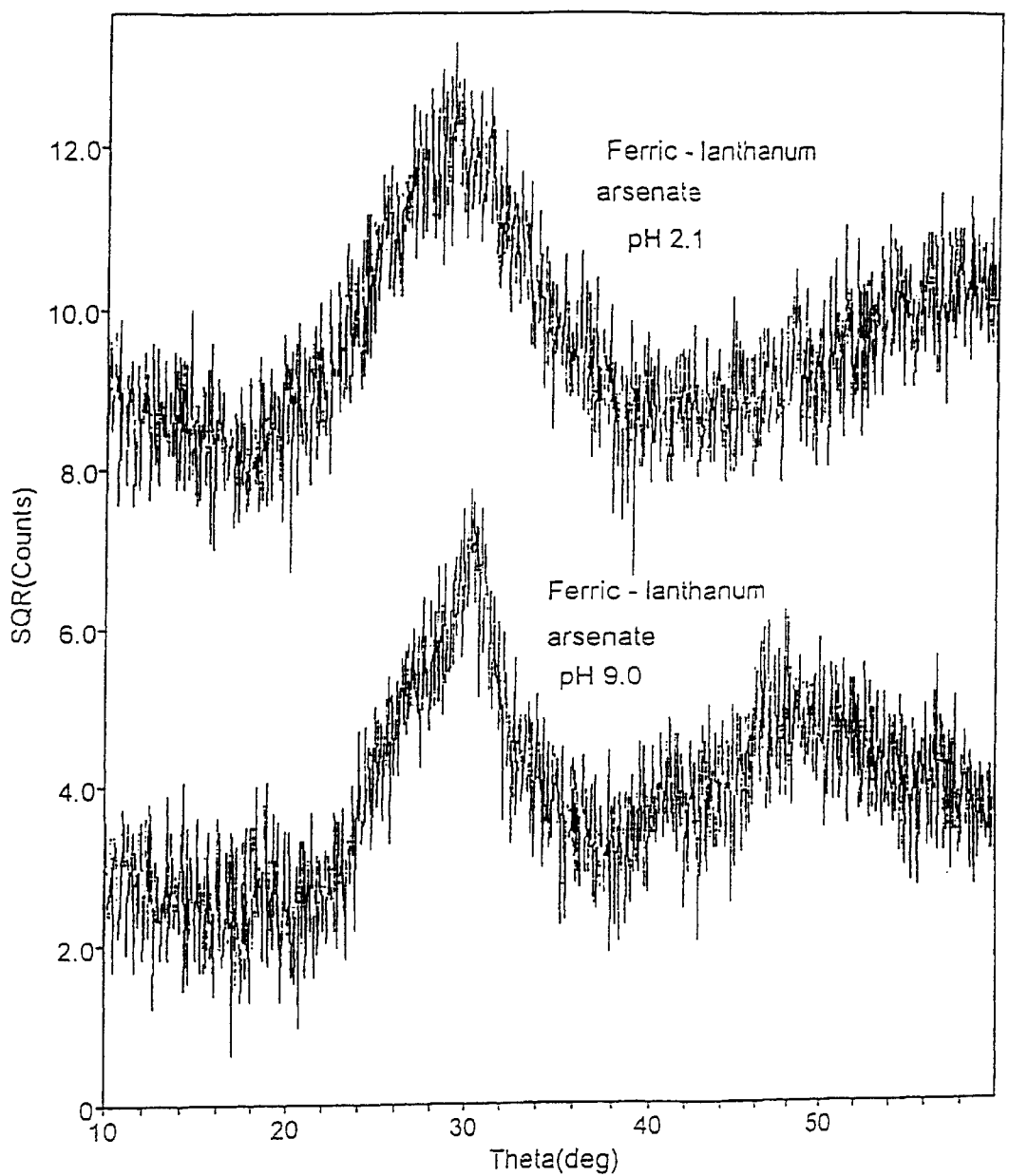
FIG. 1 shows the X-ray powder diffraction analysis of ferric-lanthanum arsenate at pH 2.1 and pH 9.0.

As used herein, "removing an ion from a solution or slurry" refers to reducing the concentration of such ion, preferably arsenite, arsenate, selenite or selenate ion, preferably to a concentration determined by the goals of the process. "Aqueous solution" refers to a solution in which water is the dissolving medium or solvent. "Slurry" refers to suspended solid particles including different ores and rocks in a liquid which contains water. A "precipitating composition" refers to any of the agents described herein that cause precipitation of the ions of interest. A "solid" material refers to the resultant material formed from the contacting of the precipitating composition with the aqueous solution or slurry. Solid materials formed include amorphous materials and crystalline materials or mixtures. The pH of the aqueous solution or slurry is adjusted by any means known by one skilled in the art, including addition of calcium hydroxide or sodium hydroxide to raise the pH or acid to lower the pH. A "concentration effective for removing at least one ion" refers to the concentration of precipitating composition required to remove a measurable amount of the selected ion. A "flocculating agent" is a chemical that induces the formation of particles suitable for precipitation. One example of a flocculating agent is BuFloc (Buckman Laboratory, Memphis, Tenn.). Adjusting the oxidation potential of the aqueous solution or slurry can be achieved by any means known to those skilled in the art, including the addition of bleach (sodium hypochlorite) to the solution. "Stabilizing an ion" refers to the process of making the ion resistant to a number of processes including leaching, degradation and other decomposition processes and does not necessarily include precipitating the ion. "Lanthanum chloride" refers to both pure and impure lanthanum chloride. Impure lanthanum chloride can contain various elements of the lanthanide series in addition to lanthanum. The lanthanide series of elements includes the elements lanthanum, cerium, praseodymium, neodymium, promethium, samarium, europium, gadolinium, terbium, dysprosium, holmium, erbium, thulium, ytterbium and lutetium.

The processes of this invention achieve the removal of more than 99% of arsenic species in an aqueous solution. Concentrations of less than 1 part per billion arsenic are achievable. The processes of this invention also stabilize arsenic ions in a slurry. The stabilized arsenic compositions formed from the processes of this invention resist decomposition and subsequent release of arsenic ions back into process water and salt water.

The processes of this invention also achieve the removal of selenium species from solution and stabilization of selenium species in slurries. Concentrations of less than 0.25 parts per million selenium are achievable using the processes of this invention. The stabilized selenium compositions formed from the processes of this invention resist decomposition and subsequent release of selenium ions back into process water.

Solutions or slurries containing arsenic and/or selenium ions are contacted with a composition capable of causing precipitation of the ions. For the removal or stabilization of arsenic ions, such compositions comprise from about 0.5 to about 5 moles of lanthanum chloride for every mole of arsenic ions in solution. For the removal or stabilization of selenium ions, such compositions comprise at least about a five-fold molar excess of lanthanum chloride to selenium ions. The compositions can optionally contain ferric or ferrous sulfate in concentrations from about 1 mole to about 50 moles ferric or ferrous ions for every mole of arsenic or selenium ions. The compositions can also optionally contain various elements of the lanthanide series.

The process of this invention is effective at a wide range of pH (from pH about 2 to pH about 10). Preferably the pH is adjusted to between about pH 3 and about pH 10, and more preferably the pH of the solution is adjusted to between about pH 8 and about pH 10.

The oxidation potential of the solution can be adjusted using any means known in the art to reduce the concentration of reagents required for effective separation. Adjustment of the oxidation potential is preferred when removing selenium from aqueous solutions. Preferably, the oxidation potential is adjusted to between about 200 to about 400 mV for removal of selenium and to between about 100 to about 200 mV for removal of arsenic. Addition of bleach (sodium hypochlorite) or passing air through the solution are preferred methods for increasing the oxidation potential of the solution.

The solution should remain in contact with the precipitating composition for a period of time sufficient to cause removal of arsenic and selenium ions to the desired concentration ranges. Typically about 5 minutes is sufficient to cause precipitation to the desired concentration range and/or stabilization of the arsenic or selenium species when the concentration of arsenic or selenium in solution or slurry is about 30 ppm or less.

A flocculating agent known in the art such as BuFloc (Buckman Laboratory, Memphis, Tenn.) or other reagents can be optionally added to the solution for ease of separating the precipitate and the solution. Any means of separating the precipitate and the solution as known in the art can be used. For small samples of aqueous solutions, filtration using filter paper is used. For large samples, settling by gravity can be used.

The processes of this invention can be used to remove arsenic and selenium from solutions that contain one or more species of arsenic and/or selenium.

A preferred process of this invention involves adjusting the pH of solution to between about 8 to about 10, adding 2 moles of lanthanum chloride for every mole of arsenic or selenium ions present in solution, adding about 5 to about 6 moles ferric or ferrous ions for every mole of arsenic or selenium ions present in solution and adjusting the oxidation potential of the solution to between about 200 to about 400 mV for removal of selenium ions and between about 100 to about 200 mV for removal of arsenic ions.

The solid compositions formed from contacting the solution or slurry with the precipitating composition are amorphous or crystalline or a mixture of each depending on the particular conditions used for precipitation or stabilization. Generally, use of lanthanum chloride alone produces a crystalline substance over a wide pH range. However, the combination of lanthanum chloride with ferric or ferrous ions produces a crystalline substance if lanthanum chloride is added before the addition of ferrous or ferric ions.

EXAMPLES

The arsenic and selenium concentrations were determined using Atomic Absorption Spectroscopy (AAS) and also using a commercial laboratory (COLTECH Envirolabs, Inc). The analytical method used was vapor generation—flame atomic absorption spectrometry using a Varian atomic absorption spectrometer equipped with an electrodeless discharge lamp and coupled to a vapor generation system. Basic sodium borohydride solution was delivered to the reaction flask of the generation system at a rate of 22–25 milliliters/minute until the maximum absorbance (at 193.7 nm for arsenic and 160.0 nm for selenium) was obtained. The reaction vessel and quartz cell were continuously purged with nitrogen gas. Suspected high arsenic concentration samples were diluted 1000 or 100 times with 10% nitric acid. Calibration standards were prepared in the same acid matrix (10% $HNO_3$) as the sample.

The structure changes of the precipitated arsenic compounds from synthetic solutions were evaluated by X-ray powder diffraction (XRD) and scanning electron microscopy (SEM). The XRD instrument used was a Philips model 3100 fitted with a variable slit, a graphite reflected-beam monochromator, and CuK$\alpha$ radiation. The operating conditions were 40 kV and 30 mA at a scanning range of 10–60 degrees theta. The SEM instrument used was a Jeol model JSM-840 with Kevex detector EDS system. Operating conditions were 15 kV with 3,000 times magnification.

Bulk synthetic solutions were prepared for arsenite and arsenate. All bulk solution were made using deionized water. The lanthanum chloride used can be pure lanthanum chloride or an impure mixture containing lanthanum chloride with lanthanum and various lanthanides (Product Code 5240 Lanthanum (Ln) Chloride, Molycorp, Inc., Mountain Pass, Calif. and product code 7169 Lac from Advanced Material Resources Limited, Toronto, Canada). Ferric sulfate and ferrous sulfate can be obtained from a variety of commercial sources.

For selenium standard solutions, a gram of metallic selenium was dissolved in nitric acid and the volume was made to 1000 ml to prepare a stock solution. 100 ml of 30 ppm solution, prepared for the stock solution was used for each test.

EXAMPLE 1

Precipitation and Removal of Arsenic from Synthetic Solutions

To separate aliquots of 100 ml of 10 ppm arsenate or arsenite solution, known amounts of precipitants (ferric sulfate or lanthanum chloride) were added. In another series of experiments, the precipitants were both added to the same aliquot, namely:
1. Ferric sulfate was added then lanthanum chloride
2. Lanthanum chloride was added then ferric sulfate
3. A mixture of ferric sulfate and lanthanum chloride was added.

Each experimental solution was stirred for 1–2 minutes after addition of the reagents and the pH was measured. The pH was adjusted to 8–10 with $Ca(OH)_2$. 2–3 drops of 5 ppm Bufloc 607 solution were added and the solution stirred gently for 5 minutes. The flocs were allowed to settle and the solution filtered with 0.45 micrometer filter paper. The filtrate was acidified with 2–3 drops of concentrated nitric acid for arsenic analysis.

Tables 1 and 2 show the removal efficiency of arsenite and arsenate with ferric sulfate alone, lanthanum chloride alone and the combined reagent (lanthanum chloride and ferric sulfate). As can be seen from Table 1, lanthanum chloride alone is more effective at removing arsenic species than ferric sulfate alone. When ferric sulfate and lanthanum chloride are used together, the concentration of arsenite is reduced further. The combination of 1000 ppm ferric sulfate and 50 ppm lanthanum chloride decreases the arsenite concentration below 1 ppb.

TABLE 1

Removal of Arsenite ($As^{+3}$)
Initial $As^{+3}$ concentration = 10 ppm

| Reagent | Concentration, ppm | Final Arsenic, ppb |
| --- | --- | --- |
| $Fe_2(SO_4)_3$ | 1000 | 124 |
| $LaCl_3$ | 50 | 51.77 |
| $Fe_2(SO_4)_3 + LaCl_3$ | $Fe_2(SO_4)_3 = 100$ $LaCl_3 = 5$ | 25.71 |
| $Fe_2(SO_4)_3 + LaCl_3$ | $Fe_2(SO_4)_3 = 100$ $LaCl_3 = 10$ | 10.31 |
| $Fe_2(SO_4)_3 + LaCl_3$ | $Fe_2(SO_4)_3 = 1000$ $LaCl_3 = 50$ | 0.85 |

Table 2 shows the efficacy of lanthanum chloride and ferric sulfate in removing arsenate species. As can be seen, lanthanum chloride alone is more effective at removing arsenate species than ferric sulfate alone. When ferric sulfate and lanthanum chloride are used together, the concentration of arsenate species is reduced further. The combination of 1000 ppm ferric sulfate and 50 ppm lanthanum chloride decreases the arsenate concentration below 1 ppb.

TABLE 2

Removal of Arsenate ($As^{+5}$)
Initial $As^{+5}$ concentration = 10 ppm

| Reagent | Concentration, ppm | Final Arsenic, ppb |
| --- | --- | --- |
| $Fe_2(SO_4)_3$ | 1000 | 3.4 |
| $LaCl_3$ | 50 | 1.0 |
| $Fe_2(SO_4)_3 + LaCl_3$ | $Fe_2(SO_4)_3 = 1000$ $LaCl_3 = 50$ | 0.85 |

Table 3 shows the removal of arsenite and arsenate from a solution containing both species. Again, the combination of lanthanum chloride (100 ppm) and ferric sulfate (50 ppm) reduced the arsenic concentration to below 1 ppb.

TABLE 3

Removal of Arsenic from Arsenite and Arsenate Mixture
Initial concentration = 10 ppm Arsenite + 10 ppm Arsenate

| Reagent | Concentration, ppm | Final Arsenic, ppb |
| --- | --- | --- |
| $Fe_2(SO_4)_3 + LaCl_3$ | $Fe_2(SO_4)_3 = 1000$ $LaCl_3 = 50$ | 1.96 |
| $Fe_2(SO_4)_3 + LaCl_3$ | $Fe_2(SO_4)_3 = 50$ $LaCl_3 = 100$ | 0.80 |

Figure 2:
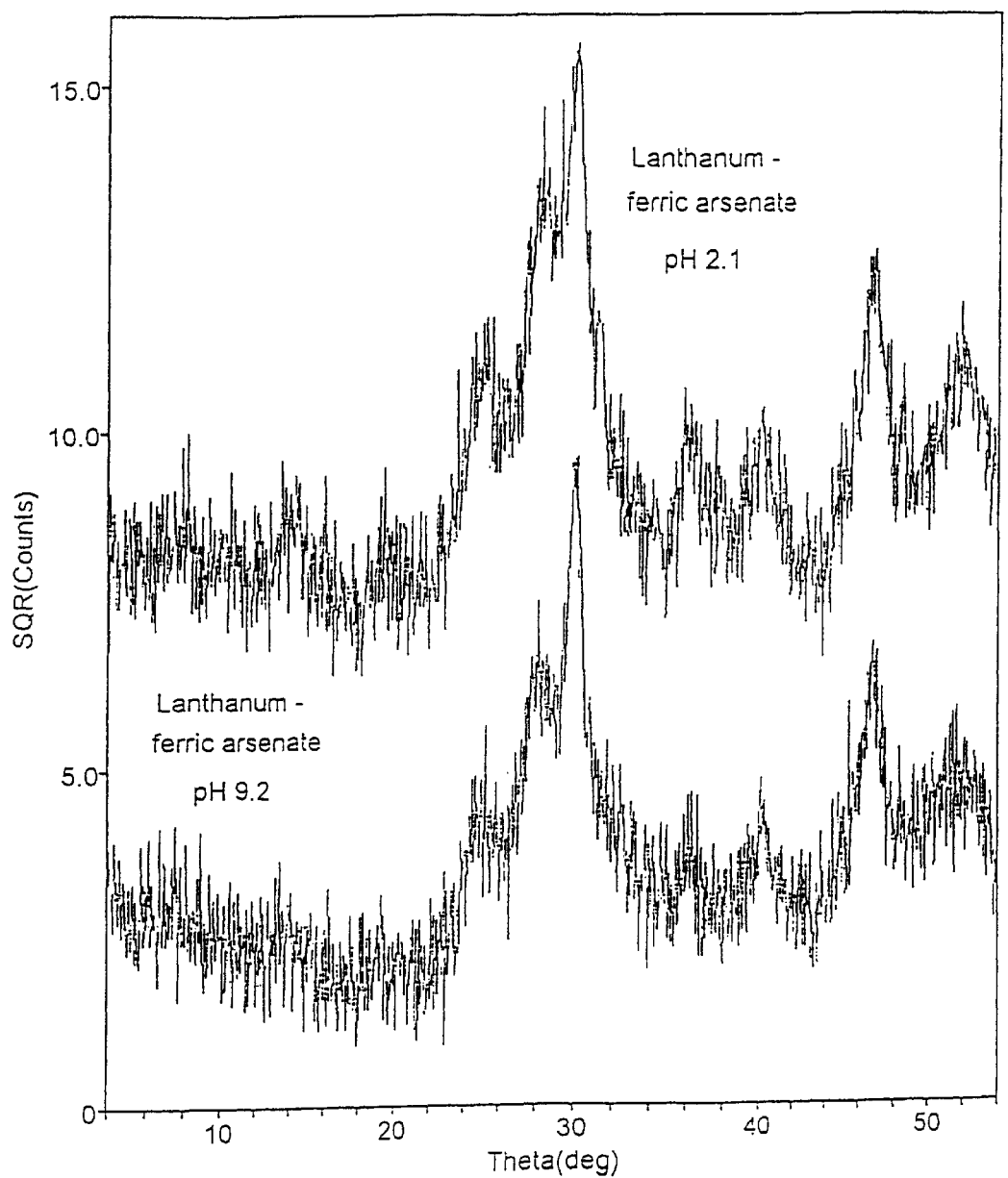
FIG. 2 shows the X-ray powder diffraction analysis of lanthanum-ferric arsenate at pH 2.1 and pH 9.2.

The significance of sequential addition of lanthanum chloride and ferric sulfate is illustrated in FIGS. 1 and 2. The precipitated arsenic compound is amorphous as shown in FIG. 1 when ferric sulfate addition to arsenic solution precedes lanthanum chloride, but the precipitate is microcrystalline as illustrated in FIG. 2 when lanthanum chloride is added to the solution before ferric sulfate.

EXAMPLE 2

Effect of Solution pH on Arsenate Removal

A series of experiments were performed to determine the effect of solution pH on arsenate removal. The initial arsenate concentration was 0.032 moles per liter. Three different molar ratios of arsenate to precipitants were used:

As:Fe=1:2

As:La=1:1

As:La:Fe=1:0.5:1

The procedure for this test was the same as Example 1, except NaOH was used for pH control, there was no addition of flocculant, and the volume of solution used was 500 ml. In the case where both lanthanum chloride and ferric sulfate were added to the solution, lanthanum chloride was added first, followed by ferric sulfate. At each specified pH, 50 ml of solution was taken out of the bulk and filtered. The filtrate was analyzed for arsenic as discussed previously. The precipitates were air dried for 48 hours, then characterized by X-ray diffraction and scanning electron microscopy. The results of arsenic removal as a function of pH are presented in Tables 4, 5, and 6.

Table 4 shows the result of pH changes on the precipitates formed when 2 moles ferric sulfate was used for every mole of arsenate ions in solution. The stability % is a measure of arsenic released to the solution when the pH was changed.

TABLE 4

Summary of Ferric-Arsenate system
Initial arsenic concentration = 400 ppm

| pH | 3.0 | 4.0 | 6.0 | 8.0 | 10.0 |
|---|---|---|---|---|---|
| Final arsenic concentration (ppm) | 3.28 | 6.38 | 31.37 | 127.51 | 337.87 |
| Color of precipitate | Cream | Light yellow | Yellow | Brown | Reddish-brown |
| Stability % | 99.2 | 98.4 | 92.2 | 68.1 | 15.5 |
| Phase separation | Feasible | Feasible | Difficult | Difficult | Very difficult |
| Relative Size of the precipitate | Large | Large | Fine | Fine | Very fine |
| Structure | Amorphous | Amorphous | Amorphous | Amorphous | Amorphous |
| Mechanism | Precipitation | Precipitation + Adsorption | Adsorption | Adsorption | Adsorption |

Table 5 shows the result of pH changes on the precipitates formed when 1 mole of lanthanum chloride was used for every 1 mole of arsenate ions in solution.

TABLE 5

Summary of Lanthanum-Arsenate system
Initial arsenic concentration = 400 ppm

| pH | 3.0 | 4.0 | 6.0 | 8.0 | 10.0 |
|---|---|---|---|---|---|
| Final arsenic concentration (ppm) | 24.72 | 17.74 | 13.13 | 2.45 | 21.35 |
| Color of precipitate | White | White | White | White | White |
| Stability % | 93.8 | 95.6 | 96.7 | 99.4 | 94.7 |
| Phase separation | Feasible | Feasible | Feasible | Feasible | Feasible |
| Relative size of the precipitate | Medium | Medium | Large | Large | Large |
| Structure | Crystalline | Crystalline | Crystalline | Crystalline | Crystalline |
| Mechanism | Precipitation | Precipitation | Precipitation | Adsorption | Adsorption |

Table 6 shows the result of pH changes on the precipitates formed when 1 mole ferric sulfate and 0.5 moles lanthanum chloride were used for every mole of arsenate ions in solution.

TABLE 6

Summary of Lanthanum-Ferric arsenate system (combination).
Initial arsenic concentration = 400 ppm

| pH | 3.0 | 4.0 | 6.0 | 8.0 | 10.0 |
|---|---|---|---|---|---|
| Final Arsenic concentration (ppm) | 74.91 | 22.85 | 1.98 | 0.26 | 21.35 |

TABLE 6-continued

Summary of Lanthanum-Ferric arsenate system (combination).
Initial arsenic concentration = 400 ppm

| pH | 3.0 | 4.0 | 6.0 | 8.0 | 10.0 |
|---|---|---|---|---|---|
| Color of precipitate | cream | Yellowish brown | Yellowish brown | Yellowish brown | Yellowish brown |
| Stability % | 81.3 | 94.3 | 99.5 | 100 | 94.7 |
| Phase separation | Feasible | Feasible | Feasible | Feasible | Feasible |
| Size of the precipitate | Large | Large | Large | Large | Large |
| Structure | Crystalline | Crystalline | Crystalline | Crystalline | Crystalline |
| Mechanism | Precipitation | Precipitation | Precipitation + Adsorption | Adsorption | Adsorption |

Figure 3:
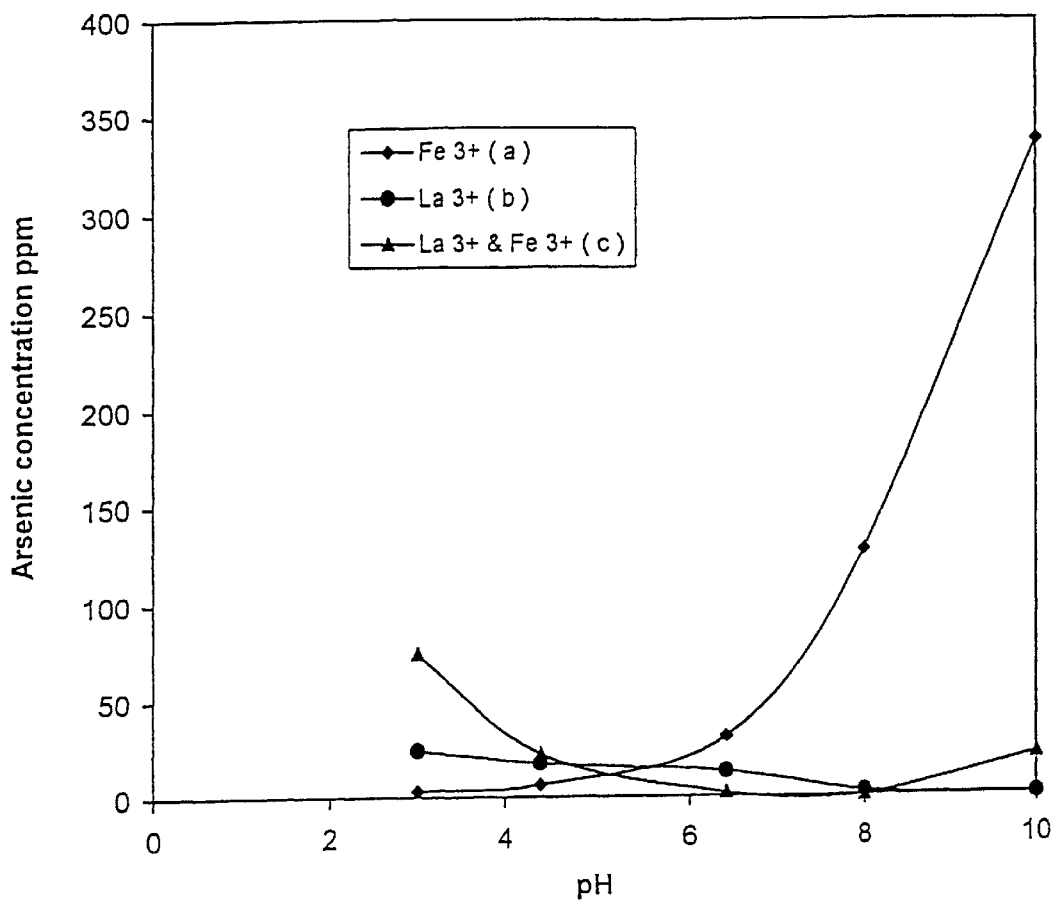
FIG. 3 shows the effect of pH on removal of arsenate using ferric sulfate, lanthanum chloride and a combination of ferric sulfate and lanthanum chloride.

From FIG. 3 it can be seen that when ferric sulfate alone was used to precipitate arsenic ions, the arsenic concentration in solution increases as pH increases. This is due to gradual decomposition of $FeASO_4$, which can be observed by the change in color of the precipitate. The low concentration of arsenic in solution at pH 3.0 suggests that the precipitated compound may be ferric arsenate. At pH 6.0 a combination of ferric arsenate and ferric hydroxide, which possibly adsorbs oxyanion of arsenate was formed. At pH 10, the precipitated solids were suspected to be ferric oxyhydroxide, which adsorb some arsenate ions onto its surface.

When lanthanum chloride alone was used to precipitate arsenic ions, a decrease in arsenic concentration was observed with rising pH as shown in FIG. 3). The precipitate, suspected to be lanthanum arsenate, lanthanum hydroxide arsenate or combination of both depending on solution pH was white and gelatinous at all pH values (3–10). The amount of solids formed increased with a corresponding pH increase.

The combination of lanthanum chloride and ferric sulfate was the most efficient method in removing arsenic from solution at pH range 6–9 as depicted in FIG. 3. The increase in arsenic concentration at pH 10 is likely due to the decomposition of the ferric arsenate phase of the precipitate. The color and amount of precipitates were almost the same at all measured pH values.

Figure 4:
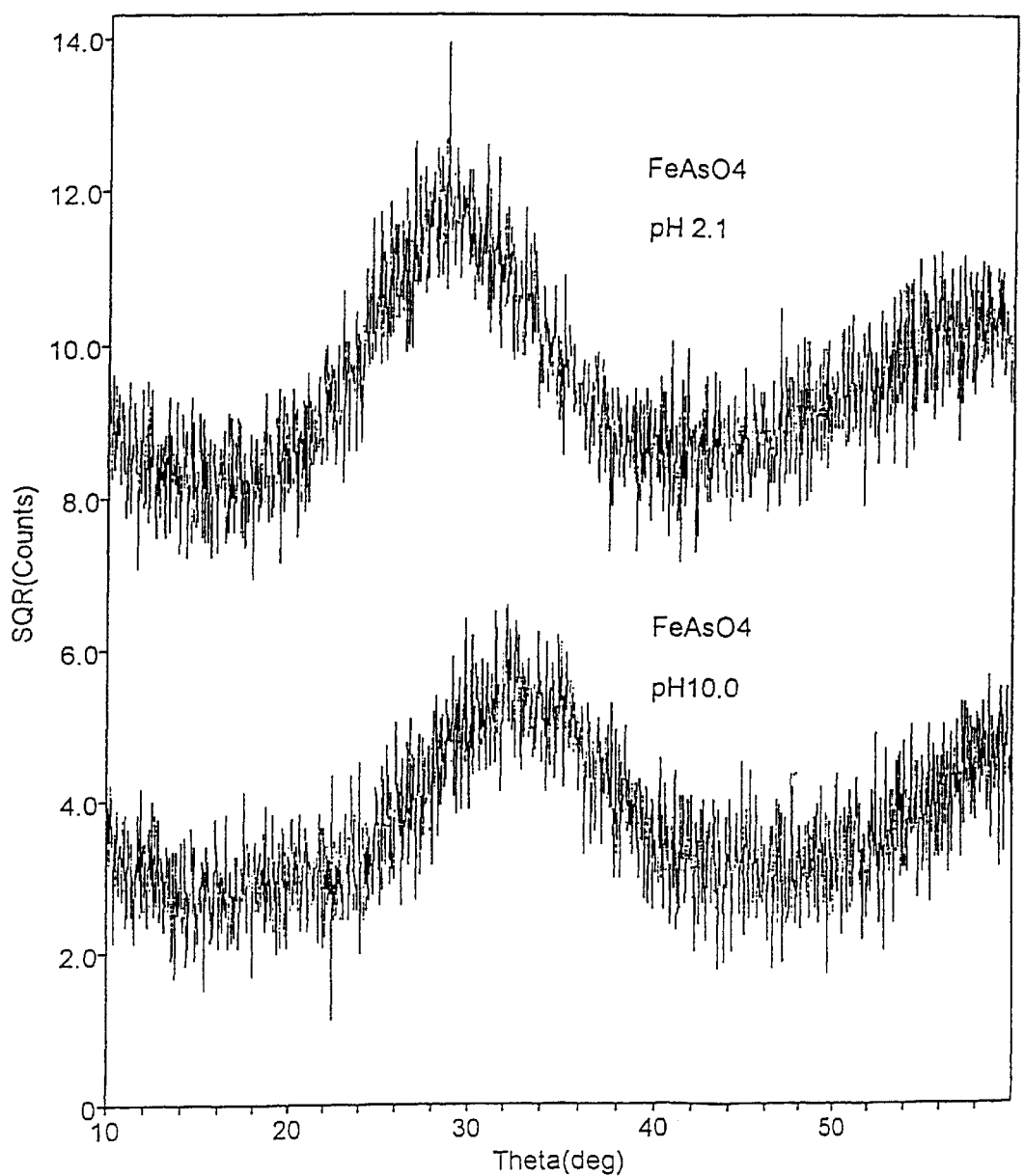
FIG. 4 shows the X-ray powder diffraction analysis of ferric arsenate at pH 2.1 and pH 10.0.
Figure 5:
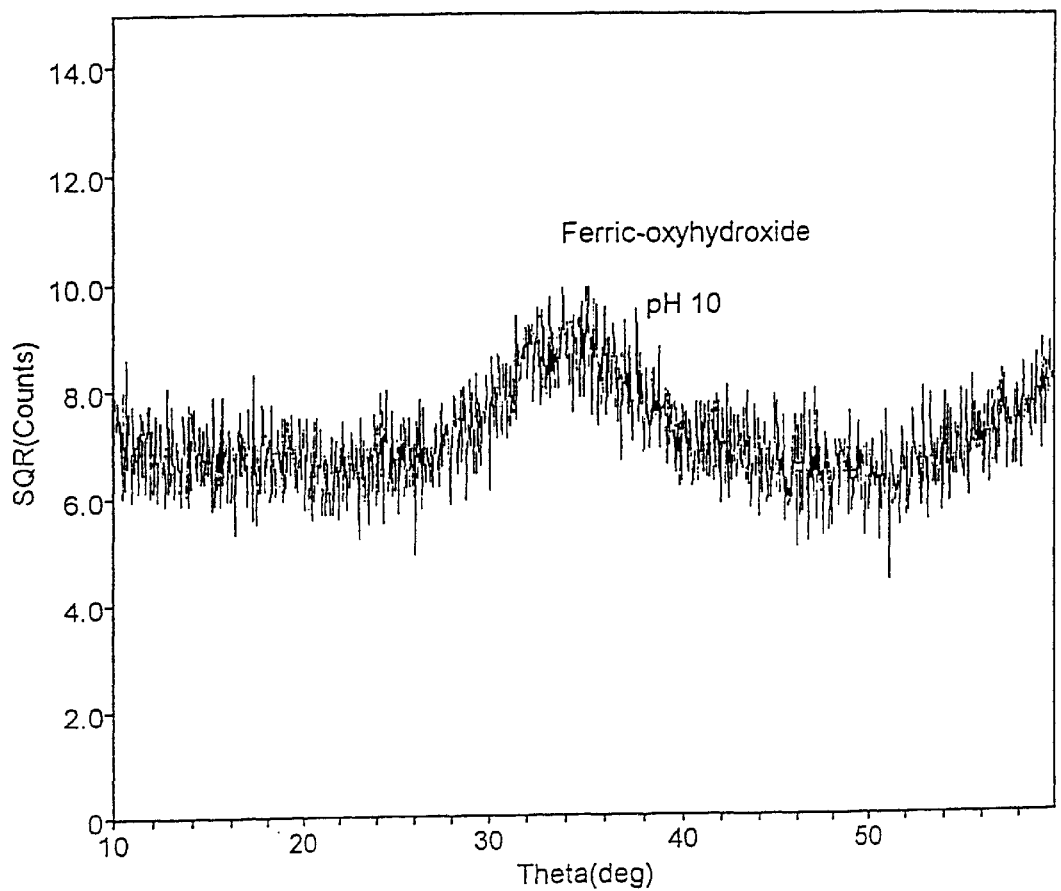
FIG. 5 shows the X-ray powder diffraction analysis of ferric oxyhydroxide at pH 10.
Figure 6:
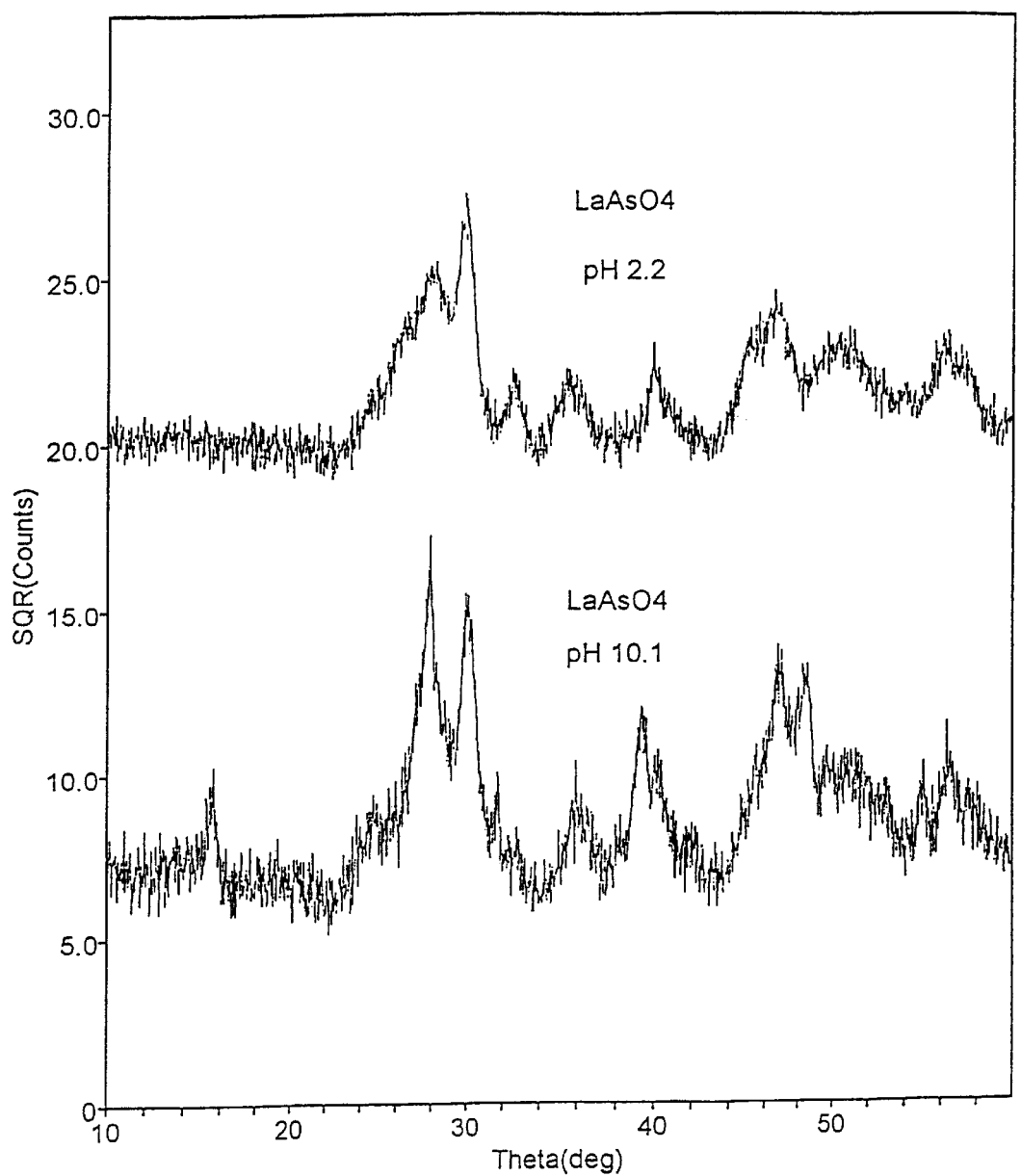
FIG. 6 shows the X-ray powder diffraction analysis of lanthanum arsenate at pH 2.2 and pH 10.1.
Figure 7:
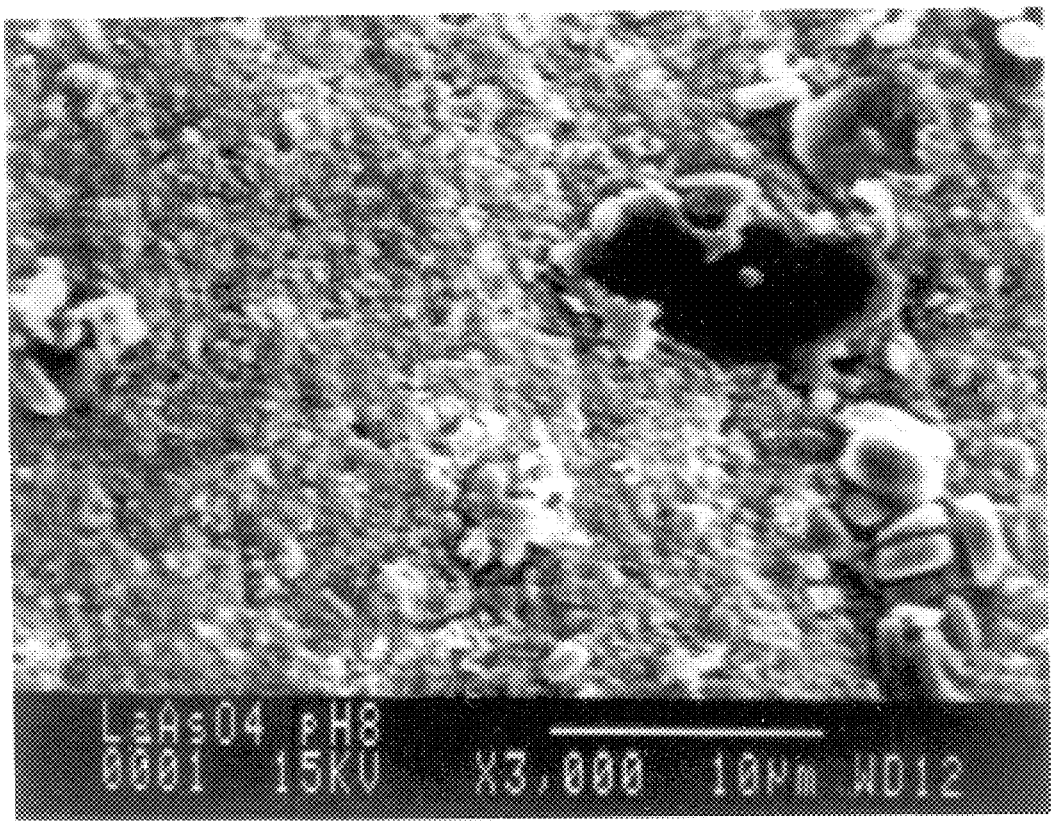
FIG. 7 shows a Scanning Electron micrograph of lanthanum arsenate crystal.

It can be seen from FIG. 4 that at room temperature regardless of pH of the solution the residual compound ferric arsenate is amorphous, hence very unstable due to the characteristic high surface energy of amorphous compounds. At pH 10.0 the structure of the precipitate is similar to the structure of ferric hydroxide shown in FIG. 5. The iron-hydroxide precipitate shown in FIG. 5 is amorphous. This suggests a complete decomposition of ferric arsenate into ferric hydroxide and soluble arsenate species. However, XRD analyses presented in FIG. 6 and the SEM picture shown in FIG. 7 indicates that the residue, lanthanum arsenate, is microcrystalline in both basic and acidic media. The degree of crystallinity increases as pH rises.

EXAMPLE 3

Removal of Arsenic from Well Water

The arsenic removal process was tested using a process water sample (DW-6) obtained from Twin Creek Mine's dewatering well (a typical mining operation in Nevada). To 100 ml DW-6 solution, known amounts of ferric sulfate and lanthanum chloride were added to separate aliquots. In another set of experiments, the precipitants were added sequentially, lanthanum chloride then ferric sulfate. The rest of this procedure was identical to the procedure described in Example 1. The pH of the solution was maintained at 8.0.

The results of these experiments are shown in Table 7. It is shown in Table 7 that 40 ppm $Fe_2(SO_4)_3$ and 40 ppm $LaCl_3$ decreased the final arsenic concentration to 3.62 ppb. Flocculation and settling tests showed that precipitants are easy to settle and filter.

TABLE 7

Removal of Arsenic from Well Water
Initial arsenic concentration = 650 ppb

| Reagent | Conc., ppm | Initial Arsenic, ppb | Final Arsenic, ppb | % Removed |
|---|---|---|---|---|
| none | 0 | 650 | 650 | 0 |
| $Fe_2(SO_4)_3$ | 40 | 650 | 132 | 79.69 |
| $LaCl_3$ | 40 | 650 | 18.28 | 97.18 |
| $Fe_2(SO_4)_3$ + $LaCl_3$ | 40 $Fe_2(SO_4)_3$ 40 $LaCl_3$ | 650 | 3.62 | 99.4 |

EXAMPLE 4

Stabilization of Arsenic in Calcined Ore and Detoxified Tailing Slurries from Minahasa (Indonesia) Newmont Gold Operation The calcined ore and tailings slurry from Minahasa, Indonesia contains appreciable amount of arsenic. During cyanidation at an alkaline pH, the oxides of arsenic are solubilized and report in the tailings. The gold tailings after cyanidation and gold recovery are subjected to $SO_2$/air oxidation to destroy cyanide. In order to meet the stringent marine discharge standards, arsenic needs to be low levels. Currently, $Fe_{2(SO4)}_3$ is being used to reduce As. This approach requires 4–5 kg of $Fe_2(SO_4)_3$ per ton of ore and it is ineffective to meet discharge standards.

Cyanidation tests were conducted with the Minahasa ore and tailings slurry using the following conditions:

| | |
|---|---|
| Pulp density | 40% |
| NaCN addition | 1 kg/ton |
| $Ca(OH)_2$ addition for pH adjustment varies | |
| Pulp pH | 10.5–11 |

Bottle roll for 24 hours (to test the stability of the precipitate to leaching).

Figure 8:
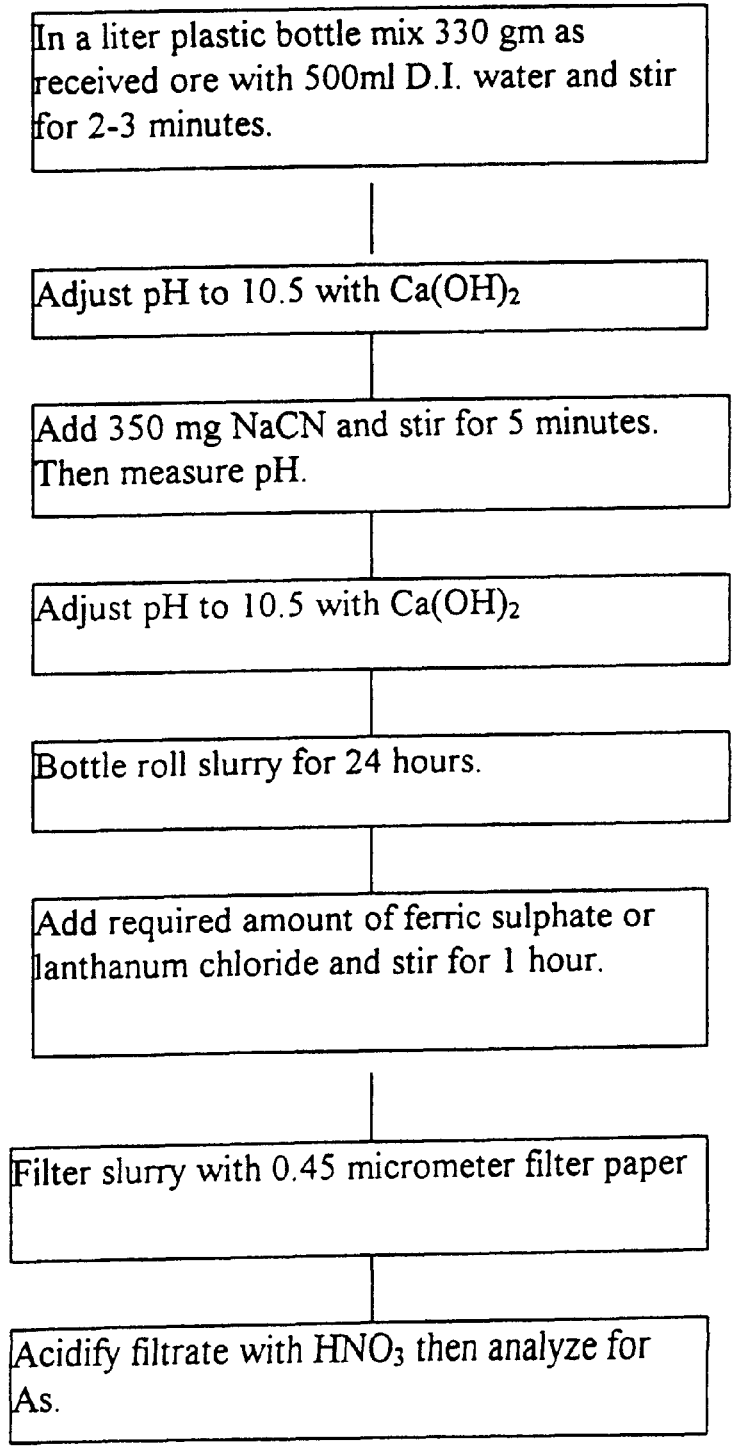
FIG. 8 shows the procedures used for arsenic stabilization in gold ore using ferric sulphate or lanthanum chloride.

The procedures for arsenic stabilization in Minahasa calcine gold ore are presented in FIGS. 8 and 9.

Tables 8 and 9 show that $LaCl_3$ alone is more effective in lowering As levels as compared to $Fe_2(SO_4)_3$ alone. Also, the concentration of $La^{3+}$ required to reduce As levels is far less when compared to the amount of $Fe^{3+}$ required. However, the As remaining in the sample was about 118 ppb (when 1000 ppm $LaCl_3$ was added) which does not meet discharge standards of 50 ppb. The combined effect of $Fe_2(SO_4)_3$ and $LaCl_3$ is given in Table 10. When 1000 ppm $Fe_2(SO_4)_3$ and 1000 ppm $LaCl_3$ were added to the slurry, the arsenic concentration was reduced to 11 ppb.

TABLE 8

Removal of As from Minahasa Calcine Ore using $LaCl_3$
(Initial As = 3020 ppb)

| Concentration, ppm | Dosage, lb/ton | As, ppb |
|---|---|---|
| 10 | 0.066 | 931 |
| 100 | 0.66 | 794 |
| 200 | 1.32 | 506 |
| 1000 | 6.60 | 118 |

TABLE 9

Removal of As from Minahasa Calcine Ore using $Fe_2(SO_4)_3$
(Initial As = 3020 ppb)

| Concentration, ppm | Dosage, lb/ton | As, ppb |
|---|---|---|
| 100 | 0.665 | 1171 |
| 200 | 1.315 | 873 |
| 1000 | 6.55 | 751 |
| 5000 | 32.75 | 479 |

TABLE 10

Removal of As from Minahasa Calcine Ore using $LaCl_3$ + $Fe_2(SO_4)_3$.
(Initial As = 3020 ppb).

| Concentration | As, ppb |
|---|---|
| 200 ppm $Fe_2(SO_4)_3$ + 200 ppm $LaCl_3$ | 773 |
| 200 ppm $Fe_2(SO_4)_3$ + 1000 ppm $LaCl_3$ | 18.54 |
| 1000 ppm $Fe_2(SO_4)_3$ + 200 ppm $LaCl_3$ | 642 |
| 1000 ppm $Fe_2(SO_4)_3$ + 1000 ppm $LaCl_3$ | 11.09 |

EXAMPLE 5

Stabilization of Arsenic in Detoxify-Tailings Slurry

Figure 12:
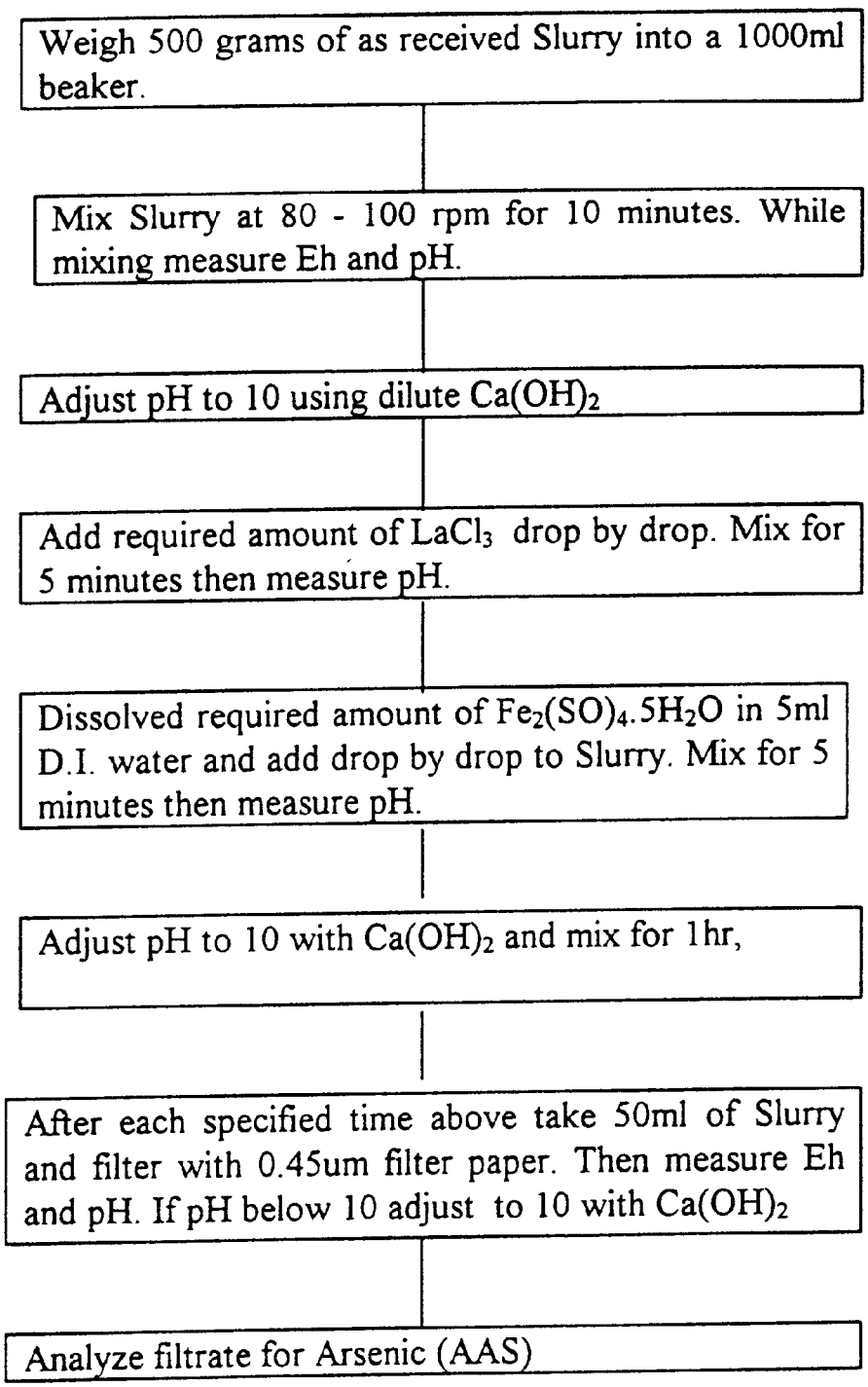
FIG. 12 shows the procedure used for stabilization of arsenic in tailings slurry with combination of lanthanum chloride and ferric sulphate.

Procedures for stabilization of arsenic in Minahasa detoxify-tailings slurry with ferric sulfate alone, lanthanum chloride alone and a mixture of lanthanum chloride and ferric sulfate are presented in FIGS. 10, 11 and 12.

The results of the experiments outlined in FIGS. 10, 11 and 12 are shown in Table 11. From Table 11 it is observed that stabilization of arsenic in the slurry was most effective with the combination of ferric sulfate and lanthanum chloride. The control experiment shows that $Ca(OH)_2$ reduced arsenic concentration almost 50% in the first hour but the compound calcium arsenate or arsenite formed was very unstable and dissociated, releasing arsenic into solution as reported after 24 hours. The sudden rise in arsenic concentration after 4 hours when 2 lb/ton $LaCl_3$ was used may be due to insufficient lanthanum hydroxide present in the solution to react with excess arsenic released into the slurry.

TABLE 11

Stabilization of Arsenic in Detoxified-Tailings Slurry.
Initial concentration of arsenic = 14 ppm

| Reagent | Dosage lb/ton slurry | 1 hour | | | 2 hours | | | 4 hours | | | 24 hours | | |
|---|---|---|---|---|---|---|---|---|---|---|---|---|---|
| | | Eh mv | pH | As ppb | Eh mv | pH | As ppb | Eh mv | pH | As ppb | Eh mv | pH | As ppb |
| Control | — | 245 | 10 | 7080 | 248 | 10 | 7160 | 261 | 10 | 9990 | 266 | 10 | 14000 |
| $Fe_2(SO4)_3$ | 4 | 230 | 10 | 413 | 240 | 9.8 | 434 | 253 | 9.5 | 671 | 270 | 8.8 | 881 |
| $LaCl_3$ | 2 | 238 | 10 | 296 | 250 | 9.8 | 266 | 262 | 9.4 | 361 | 280 | 8.8 | 1197 |
| $Fe_2(SO4)_3$ + $LaCl_3$ | 4 + 2 | 216 | 10 | 101 | 227 | 9.8 | 109 | 229 | 9.5 | 175 | 250 | 9.3 | 386 |
| $Fe_2(SO4)_3$ + $LaCl_3$ | 4 + 1 | 220 | 10 | 250 | 230 | 9.7 | 194 | 230 | 9.5 | 291 | 254 | 9.2 | 491 |

EXAMPLE 6

Stabilization of Arsenic in Solids of Minahasa Tailings Slurry in Sea Water

The tailings from Minahasa Indonesia gold mine operations is submarine discharged into the ocean. Therefore it is necessary to determine the stability of arsenic to sea water after treatment of the tailings slurry. An experiment was conducted using the following conditions:

Pulp Density=10%
Initial Sea Water pH=7.72
Initial As concentration in Sea Water=<0.05 ppb.

To a 20 gram sample of stabilized slurry (dry), 180 ml sea water was added. The slurry was stirred gently at 30 to 35 rpm. After 1 hour, 4 hours and 8 hours, the pH of the slurry was measured. At each time, 30 ml of slurry was filtered with 0.45 micron filter paper and the arsenic concentration in the filtrate was analyzed.

Experimental results of arsenic release as a function of time are given in Table 12. It can be seen that the arsenic concentration of as-received dried tailings which leached out in both sea and tap water were around 9 ppm after 8 hours. This observation reinforces the notion that arsenic is continuously released from the solid phase. Table 12 clearly shows that the slurry stabilized with combination of lanthanum chloride and ferric sulfate is strongly resistant to releasing arsenic upon exposure to seawater. In this case the arsenic concentration was about 3.98 ppm after 8 hours.

TABLE 12

Stability of Arsenic in Solids of Minahasa Tailings Slurry

| Treatment | Dosage lb/ton | 1 hour | | 4 hours | | 8 hours | |
|---|---|---|---|---|---|---|---|
| | | pH | As ppm | pH | As ppm | pH | As ppm |
| Untreated Solids from Slurry in tap water | | 8.5 | 6.14 | 8.3 | 8.43 | 8.2 | 9.02 |
| Untreated Solids from Slurry in sea water | | 8.1 | 5.35 | 8.1 | 7.45 | 8.1 | 8.9 |
| $Fe_2(SO_4)_3$ | 2.0 | 8.0 | 4.92 | 8.1 | 5.5 | 8.1 | 6.37 |
| $LaCl_3$ | 0.5 | 8.1 | 5.12 | 8.1 | 5.74 | 8.1 | 5.96 |
| $Fe_2(SO_4)_3 + LaCl_3$ | 2.0 + 0.5 | 8.0 | 3.63 | 8.1 | 3.91 | 8.0 | 3.98 |

EXAMPLE 7

Removal Of Selenium From Synthetic Solution

Experiments were conducted using synthetic solutions to study the removal of selenium ions. The synthetic solution had an oxidation potential of 540 mV, a pH of 7.0 and an initial concentration of selenium ions (as $SeO_3^{-2}$) of 30 mg/l.

One gram of metallic selenium was dissolved in nitric acid and the volume was made to 1000 ml. 100 ml of 30 ppm solution, prepared from stock solution was used for each test. Eh was not adjusted for the tests. Ferric or Ferrous Sulfate or Lanthanum Chloride was used as a precipitant. The pH was maintained at 10 using lime. After reaching a steady precipitate state, 1–2 drops of flocculant (BuFloc) was added to the precipitate. The flask along with the precipitate was maintained at 25° C. in a shaking water bath. The solution was then filtered. The filtrate was diluted one hundred times and then analyzed for selenium by atomic absorption. Results for the synthetic solutions are given in Tables 14A, 14B, and 14C.

TABLE 14A

Effect of ferric sulfate dosage on removal of selenium

| Precipitant used(mg) | pH | Final Se (ppm) |
|---|---|---|
| 618 | 10 | 11.73 |
| 1100 | 10 | 5.32 |
| 1804 | 10 | 3.8 |
| 2651 | 10 | 0.6 |

TABLE 14B

Effect of ferrous sulfate dosage on removal of selenium

| Precipitant used(mg) | pH | Final Se (ppm) |
|---|---|---|
| 645 | 10 | 7.24 |
| 1100 | 10 | 0.91 |

TABLE 14B-continued

Effect of ferrous sulfate dosage on removal of selenium

| Precipitant used(mg) | pH | Final Se (ppm) |
|---|---|---|
| 1869 | 10 | 0.35 |
| 2721 | 10 | 0.2 |

TABLE 14C

Effect of lanthanum chloride dosage on removal of selenium

| Precipitant used(mg) | pH | Final Se (ppm) |
|---|---|---|
| 251 | 10 | 2.62 |
| 479 | 10 | 0.95 |
| 875 | 10 | 0.3 |
| 1488 | 10 | 0.21 |

The experiments showed that a considerable amount of precipitant is required to lower the Selenium concentration to ppb level. The consumption of pH controlling agent (lime) was also different for the different precipitants. Among the three precipitants used, $LaCl_3$ was found to be the most efficient in terms of selenium removal. When ferrous was compared to ferric ions, it was found that ferrous was better than ferric in selenium removal.

EXAMPLE 8

Removal of Selenium from Cyanide Detox Solution

A cyanide detox solution was used to test the effect of controlling the oxidation potential of the solution. This solution was prepared from gold ores from a mining operation in Nevada. The detox solution had an initial oxidation potential of 340 mV, an initial pH of 9.0, a copper concentration of 6 mg/l, a total cyanide concentration of less than 1 ppm and a selenium concentration of 45 mg/l Se as $SeO_3^{-2}$).

In most of the precipitation tests, 200 ml of the solution or slurry was used. The sample was agitated by an overhead stirrer and continuously monitored for change in Eh and pH during the precipitation. The oxidation state of selenium was changed to a higher state (+6) in some experiments by either the addition of oxidant (bleach) or purging air through the solution and in some cases by combination of both. After controlling the Eh to the desired range, precipitant (either $FeSO_4.7H_2O$ or $Fe_2(SO_4)_3.5H_2O$ or $LaCl_3$) and pH controlling agent (lime) both in solid from were simultaneously added while maintaining the pH between 9–10. After these additions, the precipitation was allowed to occur until the Eh/pH values reached a certain steady state value. At this stage, 1–2 drops of flocculant (BuFloc) was added to the precipitate and the reaction slurry was shaken in a water bath for an hour before filtration.

Table 15A shows results obtained with addition of ferrous sulfate. By adding 1300ppm ferrous sulfate only selenium concentration to 8.4 ppm.

TABLE 15A

Effect of ferrous sulfate dosage on removal of selenium (initial Se = 45 ppm)

| Precipitant used(mg) | Final pH | Final Se (ppm) |
|---|---|---|
| 480 | 9.8 | 12.58 |
| 900 | 10.3 | 9.7 |
| 1300 | 10.2 | 8.4 |

By using the same amount of ferrous sulfate as shown in Table 15A and adjusting the potential to 540 mV with addition of bleach, selenium concentration was reduced to below 1 ppm. The results of these experiments are shown in Table 15B.

TABLE 15B

Effect of ferrous sulfate dosage on removal of selenium, after adjustment of oxidation potential using bleach.

| Precipitant used (mg) | Eh Initial | Eh Final | pH Initial | pH Final | Final Se (ppm) |
|---|---|---|---|---|---|
| 80 | 310 | 540 | 8.9 | 10.1 | 7.8 |
| 900 | 346 | 560 | 9 | 9.98 | 0.78 |
| 1300 | 372 | 570 | 8.8 | 10.2 | 0.2 |

Table 15C shows the results obtained using lanthanum chloride as the precipitating reagent. The results for selenium removal are similar to the results for arsenic removal in that lanthanum chloride alone is more effective than ferrous sulfate alone for reducing the selenium concentration of the solution.

TABLE 15C

Effect of lanthanum chloride dosage on removal of selenium

| Precipitant used(mg) | Final pH | Final Se (ppm) |
|---|---|---|
| 500 | 10 | 10.89 |
| 700 | 10 | 8.8 |

Table 15D shows that by increasing the oxidation potential by adding bleach, selenium concentration was reduced to less than 1 ppm at same concentration of lanthanum chloride as shown in Table 15C.

TABLE 15D

Effect of lanthanum chloride dosage on removal of selenium, after adjustment of oxidation potential using bleach.

| Precipitant used (mg) | Eh Initial | Eh Final | pH Initial | pH Final | Final Se (ppm) |
|---|---|---|---|---|---|
| 500 | 330 | 80 | 9 | 10.2 | 3.2 |
| 700 | 336 | 510 | 9.2 | 9.97 | 0.27 |

From the experimental data using various precipitants, it can be concluded that both the pH and Eh must be controlled for an effective removal of selenium species from a cyanide detoxified solution subjected to the Inco process of destroying cyanide by passing $SO_2$ over the solution in the presence of air and copper.

EXAMPLE 9

Selenium Stability Tests

In a series of tests, the stability of the selenium precipitates formed using ferrous sulfate and lanthanum chloride was studied. Testing procedures were analogous to the arsenic stability tests discussed above. The reaction was allowed to continue for 24 hr. in a water bath, at a constant temperature of 25 degrees C. It can be seen from Table 16 that the selenium concentration remains relatively constant with the use of lanthanum chloride as the precipitating composition but the selenium concentration in solution after 24 hours increases when ferrous sulfate was used.

TABLE 16

Stability of selenium using ferrous sulfate and lanthanum chloride

| Precipitant used(mg) | Final Se (ppm) after 1 Hr. | Final Se (ppm) after 24 Hr. |
|---|---|---|
| 480 mg $FeSO_4$ | 13.2 | 16.7 |
| 500 mg $LaCl_3$ | 10.71 | 10.89 |

Although the description above contains many specificities, these should not be construed ting the scope of the invention but as merely providing illustrations of some of the presently-preferred embodiments of this invention. Thus the scope of the invention should be determined by the appended claims and their legal equivalents, rather than by the examples given. All references cited are incorporated by reference in their entirety to the extent not inconsistent with the disclosure herein.

We claim:

1. A method of removing at least one ion selected from the group consisting of arsenite, arsenate, selenite and selenate from an aqueous solution or a slurry containing said ion, comprising the steps of:

contacting said solution or slurry with a precipitating composition comprising lanthanum chloride whereby said ion forms a solid material comprising said precipitating composition and said ion; and separating said solution or slurry from said solid material.

2. The method of claim 1 wherein said precipitating composition further comprises an additional element which is a member of the lanthanide series of elements wherein said additional element is not lanthanum.

3. The method of claim 1 wherein said precipitating composition further comprises ferric sulfate.

4. The method of claim 1 wherein said precipitating composition further comprises ferrous sulfate.

5. The method of claim 1 wherein the pH of said aqueous solution or slurry is adjusted to between about 2 to about 12 after contacting said solution or slurry with said precipitating composition.

6. The method of claim 1 wherein the pH of said aqueous solution or slurry is adjusted to between about 3 to about 10 after contacting said solution or slurry with said precipitating composition.

7. The method of claim 1 wherein the pH of said aqueous solution or slurry is adjusted to between about 8 to about 10 after contacting said solution or slurry with said precipitating composition.

8. The method of claim 1 wherein said precipitating composition comprises about 5 to 100 percent lanthanum chloride and about 95 to 0 percent ferric sulfate.

9. The method of claim 1 wherein the oxidizing potential of said aqueous solution or slurry is adjusted to between about 100 to about 200 mV for removal of arsenite or arsenate and between about 200 to about 400 mV for removal of selenite or selenate.

10. The method of claim 1 further comprising the steps of:

adjusting the oxidation potential of said aqueous solution or slurry to between about 100 to about 200 mV for removal of arsenite or arsenate and between about 200 to about 400 mV for removal of selenite or selenate;

adjusting the pH of said aqueous solution or slurry to between about 2 to about 12; and adding a flocculating agent to said aqueous solution of slurry.

11. The method of claim 1 wherein arsenite or arsenate is removed.

12. The method of claim 1 wherein arsenite or arsenate is removed down to a concentration of less than about 1 ppb.

13. The method of claim 1 wherein selenite or selenate is removed.

14. The method of claim 1 wherein selenite or selenate is removed down to a concentration of less than about 0.02 ppm.

15. The method of claim 1 wherein the oxidizing potential of said aqueous solution or slurry is adjusted to about 500 mV before contacting said aqueous solution or slurry with said precipitating composition.

16. The method of claim 15 wherein the pH of said aqueous solution or slurry is adjusted to about 10 after contacting said solution or slurry with said precipitating composition.

17. The method of claim 1 wherein the oxidizing potential of said aqueous solution or slurry is adjusted to about 100 to about 400 mV before contacting said aqueous solution or slurry with said precipitating composition.

18. A method of stabilizing an ion selected from the group consisting of arsenite, arsenate, selenite, and selenate in an aqueous solution or a slurry containing said ion comprising contacting said solution or slurry with a precipitating composition comprising lanthanum chloride whereby said ion forms a solid material comprising said precipitating composition and said ion.

19. The method of claim 18 wherein said precipitating composition further comprises an additional element which is a member of the lanthanide series of elements wherein said additional element is not lanthanum.

20. The method of claim 18 wherein said precipitating composition further comprises ferric sulfate.

21. The method of claim 18 wherein said precipitating composition further comprises ferrous sulfate.

22. The method of claim 18 wherein the pH of said aqueous solution or slurry is adjusted to about 2 to about 12 after contacting said solution or slurry with said precipitating composition.

23. The method of claim 18 wherein the pH of said aqueous solution or slurry is adjusted to about 2 to about 10 after contacting said solution or slurry with said precipitating composition.

24. The method of claim 18 wherein the pH of said aqueous solution or slurry is adjusted to about 8 to about 10 after contacting said solution or slurry with said precipitating composition.

25. A method of removing selenium ions from a solution or slurry comprising the steps of:

adjusting the oxidation potential of said solution or slurry to about 200 to about 400 mV using bleach:

adding to said solution or slurry about 2 moles of lanthanum chloride for every 1 mole of selenium ions present in said solution or slurry;

adding to said solution or slurry about 5 to 6 moles ferric or ferrous ions for every 1 mole of selenium ions present in said solution or slurry;

adjusting the pH of said solution or slurry to between about 8 and about 10;

adding a flocculating agent to said solution or slurry; and allowing the flocs formed after adding said flocculating agent to said solution or slurry to settle.

26. A method of removing arsenic ions from a solution or slurry comprising the steps of:

adding to said solution or slurry about 2 moles of lanthanum chloride for every 1 mole of arsenic ions present in said solution or slurry;

adding to said solution or slurry about 5 to 6 moles ferric or ferrous ions for every 1 mole of arsenic ions present in said solution or slurry;

adjusting the pH of said solution or slurry to between about 8 and about 10;

adding a flocculating agent to said solution or slurry; and allowing the flocs formed after adding said flocculating agent to said solution or slurry to settle.

27. A method of stabilizing selenium ions in an aqueous solution or slurry comprising the steps of:

adjusting the oxidation potential of said solution or slurry to about 200–400 mV using bleach;

adding to said solution or slurry about 2 moles of lanthanum chloride for every 1 mole of selenium ions present in said solution or slurry;

adding to said solution or slurry about 5 to 6 moles ferric or ferrous ions for every 1 mole of selenium ions present in said solution or slurry; and adjusting the pH of said solution or slurry to between about 8 and about 10.

28. A method of stabilizing arsenic ions in an aqueous solution or slurry comprising the steps of:

adding to said solution or slurry about 2 moles of lanthanum chloride for every 1 mole of arsenic ions present in said solution or slurry;

adding to said solution of slurry about 5 to 6 moles ferric or ferrous ions for every 1 mole of arsenic ions present in said solution or slurry; and adjusting the pH of said solution or slurry to between about 8 and 10.

* * * * *

UNITED STATES PATENT AND TRADEMARK OFFICE
CERTIFICATE OF CORRECTION

PATENT NO. : 6,197,201 B1  
DATED : March 6, 2001  
INVENTOR(S) : Misra et al.

Page 1 of 1

It is certified that error appears in the above-identified patent and that said Letters Patent is hereby corrected as shown below:

Column 3,  
Line 24, replace "clays" with -- days --.

Column 11,  
Line 21, replace "FeASO$_4$" with -- FeAsO$_4$ --.  
Line 32, replace "FIG. 3)." with -- FIG. 3. --.

Column 12,  
Line 47, replace "contains appreciable" with -- contains an appreciable --.  
Line 53, replace "Fe$_{2(SO4)3}$" with -- Fe$_2$(SO$_4$)$_3$ --.

Column 15,  
Line 39, replace "for the tests" with -- for the synthetic tests --.

Column 16,  
Line 66, replace "only selenium" with -- only reduces selenium --

Column 17,  
Line 23, column 1 of table 15B replace "80" with -- 480 --.  
Line 54, column 3 of table 15D replace "80" with -- 480 --.

Column 18,  
Line 19, replace construed ting" with -- construed as limiting --.

Signed and Sealed this

Eleventh Day of December, 2001

*Attest:*

NICHOLAS P. GODICI  
*Attesting Officer*    *Acting Director of the United States Patent and Trademark Office*